Patented June 24, 1930

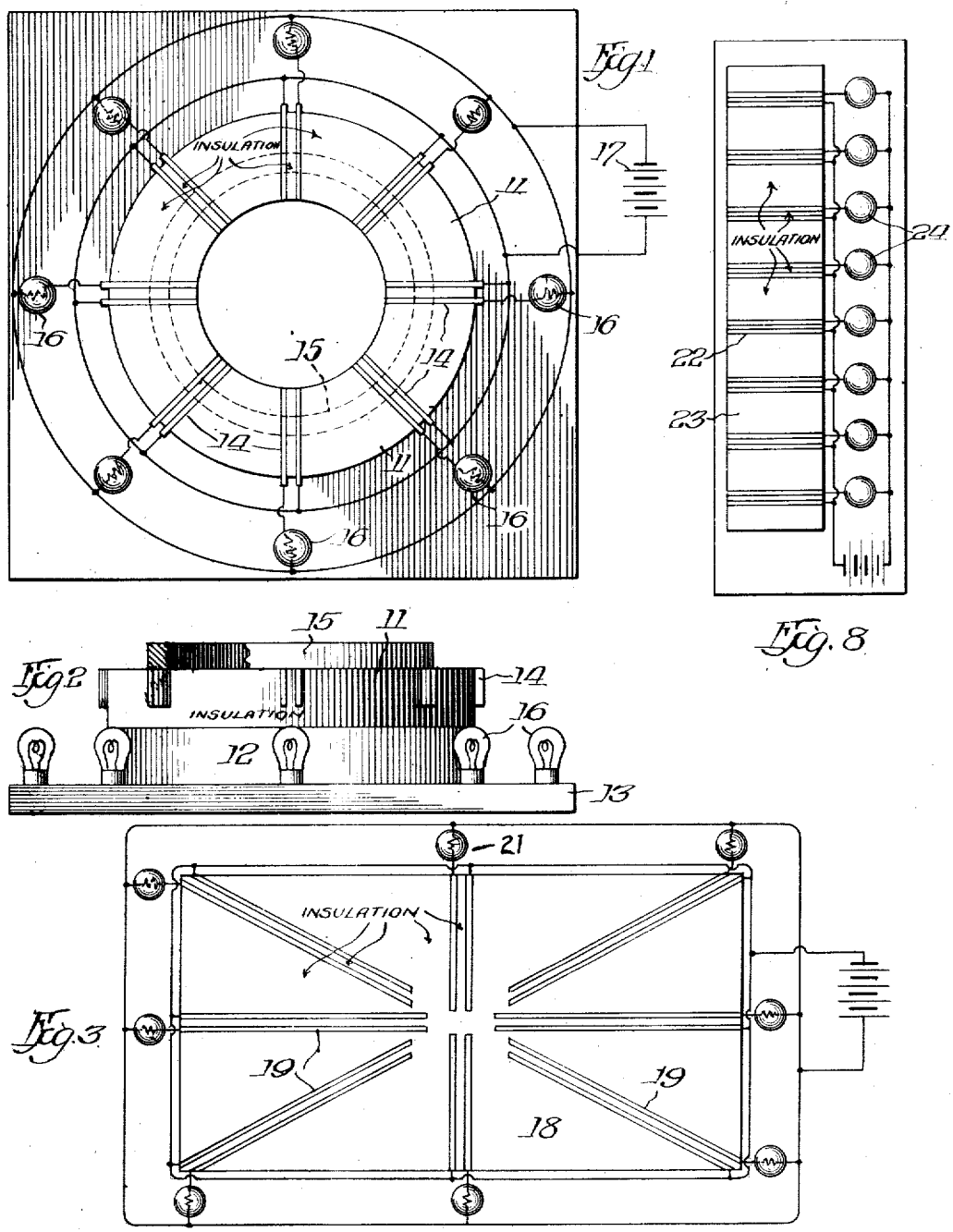

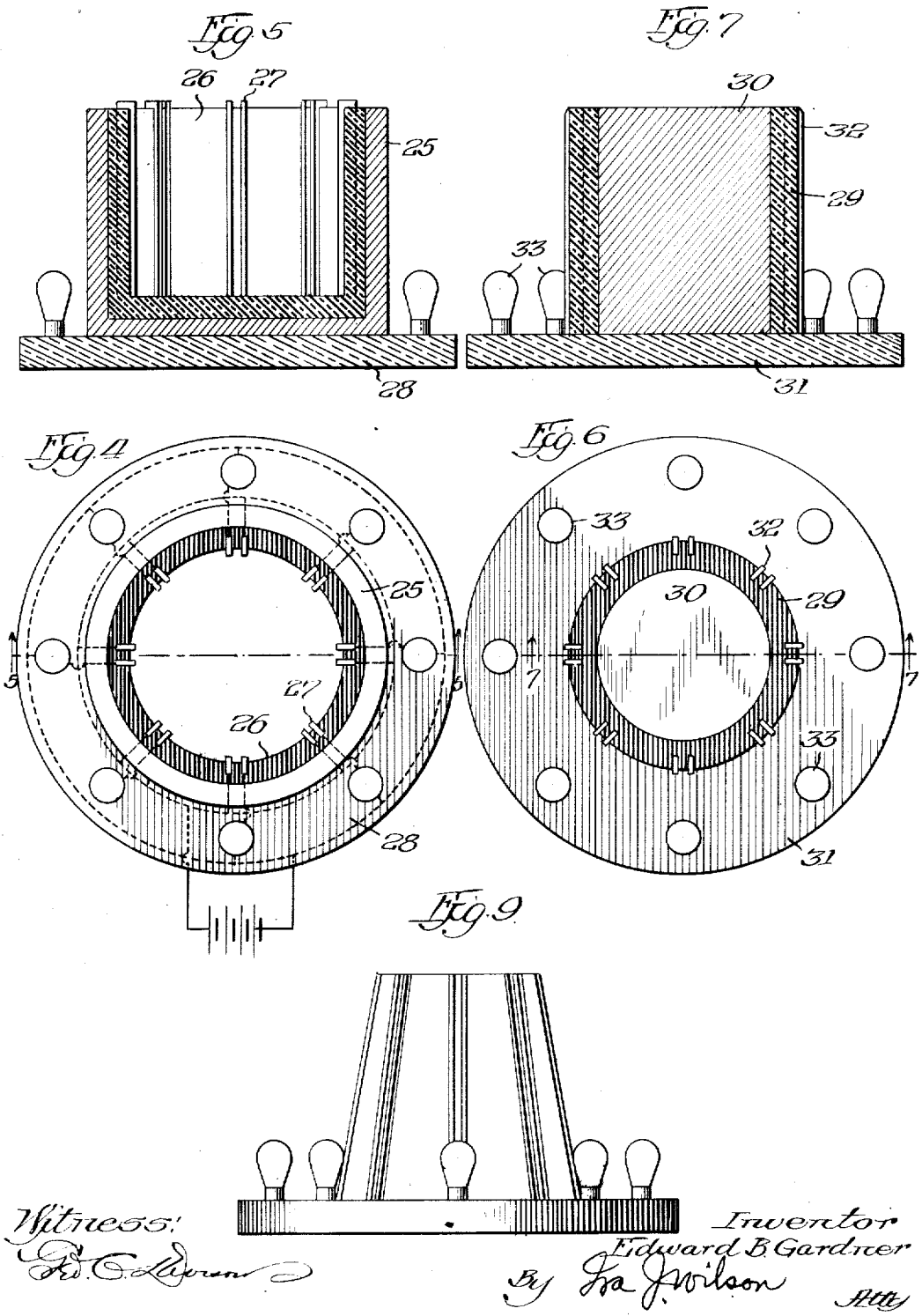

1,766,991

UNITED STATES PATENT OFFICE

EDWARD B. GARDNER, OF BELOIT, WISCONSIN

APPARATUS FOR TESTING SURFACES

Application filed June 11, 1928. Serial No. 284,290.

This invention relates to an apparatus for testing surfaces.

The usual method of testing surfaces which has been used in the past is the well-known method of "spotting in." The "spotting in" method consisted of covering the surface desired to be tested with bluing pressing such surface against another surface to which it is desired to conform and frictionally rubbing the two surfaces together. If the bluing was rubbed off at any point it was obvious that the surfaces did not conform. This method has several disadvantages. One is that where the surface desired to be tested is on an article which is comparatively fragile or pliable, such as a piston ring, the article can not be pressed against the surface to which it is desired to conform in order to make the test because the necessary pressure would be apt to warp the article making the two surfaces conform temporarily only and defeating the test. If the article is fragile the necessary pressure to make the test by the "spotting in" method would be apt to permanently injure the article. Another disadvantage of the "spotting in" method is the comparatively great length of time required.

The primary object of this invention is to provide an apparatus for testing surfaces without the necessity of exerting any pressure on the article to be tested.

Another object of this invention is to provide an apparatus for testing surfaces by means of which the test may be made almost instantaneously.

Other and further objects of this invention will be apparent as the same becomes better understood from an examination of the specification and claims in connection with the accompanying drawings wherein:

Fig. 1 is a plan view of an apparatus embodying this invention,

Fig. 2 is an elevation of the same,

Fig. 3 is a plan view of a modification,

Fig. 4 is a plan view of another modification,

Fig. 5 is a section taken at the line 5—5 of Fig. 4,

Fig. 6 is a plan view of another modification,

Fig. 7 is a section taken at the line 7—7 of Fig. 6,

Fig. 8 is a plan view of another modification, and

Fig. 9 is an elevation of another modification.

Referring to the drawings more particularly, numeral 11 represents a hard rubber disk attached above a metal plate 12 which prevents the disk from losing its shape. The plate 12 is mounted upon a suitable base 13. The rubber disk 11 is provided with a plurality, in this instance 8, of equi-angularly spaced pairs of radially extending metal contact elements, or poles 14 which are pressed solidly into slots around the disk a short gap being provided between the two poles of each pair. The various pairs of poles 14 supplement each other and in this instance are 45° apart. The top surface of all the poles 14 are machined to be in a common flat plane or surface so that when a ring 15 or other article, the surface of which is desired to be tested is placed on the disk, it will close the gap between each pair of poles provided the surface of the ring conforms at each pole to such plane.

Each pair of poles 14 as shown in Figure 1 is in an electric circuit including an electric light 16 situated radially of the respective pair of poles. These circuits are connected in parallel to a source of current 17. If the ring is warped or has any inaccuracy in the surface it will miss at least one of the poles 14, and should it miss any pole the lamp corresponding to the pair of poles including the pole missed will remain unlighted. If the surface of the ring conforms to the plane of the top of the poles all of the lights will go on. If it is desired to make a more accurate test the ring may be rotated and if none of the lights go out the surface on the ring may be regarded as very accurately formed.

Referring to the modification shown in Figure 3 the device illustrated is very similar to that previously described, the exception being that the hard rubber disk designated in this instance as 18, is of rectangular shape for testing a rectangular surface. The various pairs of poles, here designated as 19, are as before symmetrically positioned in predeterminately spaced relation on the disk and extend outwardly in substantially radial directions from the center thereof. In this case as in the previous embodiment, electric lamps 21 are symmetrically positioned about the disk 18 one at the outer end of each of the respective pairs of poles 19. The circuits for the poles and lamps are the same as in the previous embodiment.

Referring to the modification illustrated in Figures 4 and 5, the apparatus may be constructed to test the roundness of shafts or other circular objects. In this modification there is shown a cylindrically shaped supporting member 25, open at its upper end and containing an inner cylindrical member 26 of hard rubber. The pairs of poles 27 are arranged vertically within the member 26 and are pressed in equiangularly spaced relation into the inner periphery thereof. The pairs of poles 27 supplement each other and their inner surfaces extend to a predetermined cylindrical surface to which it is desired that the surface tested conform. In this case lamps are symmetrically arranged as before on a base 28 outside of the member 25 one adjacent and corresponding to each pair of poles. These lamps and poles are arranged in circuit with a source of current as in the previous embodiment.

Referring to the modification shown in Figures 6 and 7 there is illustrated an embodiment of this invention by means of which holes may be measured for roundness. In the apparatus shown a hard rubber cylinder 29 supported internally by a metallic plug 30 is mounted on a base 31. A plurality of pairs of poles 23 are mounted in equally spaced relation about the periphery of the cylinder 29 and are pressed into longitudinal slots therein. The outer surface of each of the poles 32 extends to a predetermined cylindrical surface surrounding the cylinder 29. Symmetrically situated on the base 31 are lamps 33 one opposite each pair of poles. These lamps are connected in circuit with the respective poles and a source of current as in the other embodiments. It will be apparent that an object provided with a hole desired to be tested may be slipped over the cylinder 29 and the test accomplished in a manner similar to that in which the previous embodiments were used.

Referring to the modification illustrated in Figure 8, the pairs of poles 22 may be arranged in longitudinally predeterminately spaced relation on a hard rubber strip 23 for testing straight edges, long bars, shafting, etc. In this case the rubber strip 23 is reinforced by a suitable metal mount and placed on a base as before and lamps 24 are arranged adjacent one end of each of the respective pairs of poles and are in circuit therewith together with a source of current as in the other embodiments.

Referring to the modification shown in Figure 9 the apparatus shown therein is substantially the same as that shown in Figures 6 and 7 with the exception that the hard rubber cylinder supporting the poles is upwardly tapered and the poles correspondingly sloped in order that the apparatus may be used for testing the roundness of different sized holes.

It will be apparent that with the use of the aforedescribed apparatus the testing of surfaces will be greatly facilitated and that the testing of many surfaces will be permitted which heretofore could not be obtained with the desired degree of accuracy.

I am aware that many changes may be made without departing from the principles of this invention and I therefore do not wish to be limited to the details shown and described.

I claim:

1. An apparatus for testing the shape of articles comprising a base of insulating material, a plurality of electrical contact elements imbedded therein and arranged in spaced relation to conform to the desired shape of the article to be tested, a plurality of electrically operable indicators, and an electric circuit including a source of current, said elements and indicators, the circuit being adapted to be closed by the article to be tested.

2. An apparatus for testing the shape of articles comprising a plurality of angularly spaced radially extending electrical contact elements arranged to conform to the desired shape of the article to be tested, a plurality of electrically operable indicators, and an electrical circuit including said elements and indicators, the circuit being adapted to be closed by engagement of the article to be tested with said elements.

3. An apparatus for testing the shape of articles comprising a plurality of angularly spaced pairs of radially extending electrical contacting elements arranged to conform to the desired shape of the article to be tested, a plurality of electrically operable indicators, and an electric circuit including said elements and indicators, the circuit being adapted to be closed by contact of the article to be tested with said elements.

4. An apparatus for testing the shape of articles comprising a plurality of angularly spaced pairs of radially extending electrical contact elements arranged to conform to the desired shape of the articles to be tested, a plurality of electrically operable indicators in similarly spaced positions, and an electric circuit including said elements and indicators, the circuit being adapted to be closed by contact of the article to be tested with said elements.

5. An apparatus for testing the shape of articles, comprising a plurality of pairs of contact elements electrically insulated from each other and arranged to conform to the desired shape of the articles to be tested, and a plurality of electric circuits each including a source of current and an indicator connected to the elements of each pair, one circuit being adapted to be closed by engagement of certain portions of the article to be tested with both elements of a pair.

6. An apparatus for testing the shape of articles comprising a plurality of contact elements electrically insulated from each other and arranged to conform to the desired shape of the articles to be tested, an electric circuit including a source of current, an indicator and certain of the elements, each circuit being adapted to be closed by engagement of certain portions of the article to be tested with the respective elements.

In witness of the foregoing I affix my signature.

EDWARD B. GARDNER.

CERTIFICATE OF CORRECTION.

Patent No. 1,766,991.  Granted June 24, 1930, to

EDWARD B. GARDNER.

It is hereby certified that error appears in the printed specification of the above numbered patent requiring correction as follows: Page 3, line 12, claim 5, for the word "each" read one, and line 13, for the word "one" read each; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.

circuit including said elements and indicators, the circuit being adapted to be closed by contact of the article to be tested with said elements.

5. An apparatus for testing the shape of articles, comprising a plurality of pairs of contact elements electrically insulated from each other and arranged to conform to the desired shape of the articles to be tested, and a plurality of electric circuits each including a source of current and an indicator connected to the elements of each pair, one circuit being adapted to be closed by engagement of certain portions of the article to be tested with both elements of a pair.

6. An apparatus for testing the shape of articles comprising a plurality of contact elements electrically insulated from each other and arranged to conform to the desired shape of the articles to be tested, an electric circuit including a source of current, an indicator and certain of the elements, each circuit being adapted to be closed by engagement of certain portions of the article to be tested with the respective elements.

In witness of the foregoing I affix my signature.

EDWARD B. GARDNER.

CERTIFICATE OF CORRECTION.

Patent No. 1,766,991.  Granted June 24, 1930, to

EDWARD B. GARDNER.

It is hereby certified that error appears in the printed specification of the above numbered patent requiring correction as follows: Page 3, line 12, claim 5, for the word "each" read one, and line 13, for the word "one" read each; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.